(12) United States Patent
Uchiyama et al.

(10) Patent No.: US 10,478,962 B2
(45) Date of Patent: Nov. 19, 2019

(54) ROBOT BASE STAND

(71) Applicant: FANUC CORPORATION, Yamanashi (JP)

(72) Inventors: Tatsuhiro Uchiyama, Yamanashi-ken (JP); Hikaru Yamane, Yamanashi-ken (JP); Masanori Itou, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/941,360

(22) Filed: Mar. 30, 2018

(65) Prior Publication Data

US 2018/0290290 A1    Oct. 11, 2018

(30) Foreign Application Priority Data

Apr. 5, 2017   (JP) ................. 2017-075244

(51) Int. Cl.
| | |
|---|---|
| B25H 1/10 | (2006.01) |
| B25H 1/04 | (2006.01) |
| B25J 5/00 | (2006.01) |
| B25J 9/00 | (2006.01) |
| B25J 9/16 | (2006.01) |

(52) U.S. Cl.
CPC ............ *B25H 1/10* (2013.01); *B25H 1/04* (2013.01); *B25J 5/007* (2013.01); *B25J 9/0009* (2013.01); *B25J 9/0096* (2013.01); *B25J 9/162* (2013.01)

(58) Field of Classification Search
CPC ........ A47B 39/023; A47B 39/02; A47B 39/00
USPC .... 108/65, 64, 143, 102, 88, 50.01, 137, 63, 108/103, 69, 93, 92; 297/149, 135, 150, 297/151, 136, 138, 140, 174 R, 172, 143
See application file for complete search history.

(56) References Cited

U.S. PATENT DOCUMENTS

| | | | | |
|---|---|---|---|---|
| 57,209 | A | * | 8/1866 | Staples ................. A47B 13/16 108/26 |
| 187,429 | A | * | 2/1877 | Sykes .................. A47B 83/045 312/235.3 |
| 1,264,474 | A | * | 4/1918 | Baker .................... A47B 21/02 190/12 A |
| 2,375,696 | A | * | 5/1945 | Shick .................. A47B 19/002 297/174 R |
| 2,614,017 | A | * | 10/1952 | Mugnier .............. A47B 17/036 108/93 |

(Continued)

FOREIGN PATENT DOCUMENTS

| | | |
|---|---|---|
| CN | 204565834 U | 8/2015 |
| JP | 6440308 A | 2/1989 |

(Continued)

OTHER PUBLICATIONS

English Abstract and Machine Translation for Japanese Publication No. 2010-247267 A, published Nov. 4, 2010, 9 pgs.

(Continued)

*Primary Examiner* — Jose V Chen
(74) *Attorney, Agent, or Firm* — Fredrikson & Byron, P.A.

(57) ABSTRACT

A robot base stand includes: a first support table configured to mount a robot thereon; a second support table configured to place thereon objects to be handled by the robot; and a relative distance adjusting mechanism that adjusts the relative distance between the first support table and the second support table.

9 Claims, 4 Drawing Sheets

(56) References Cited

U.S. PATENT DOCUMENTS

| | | | | |
|---|---|---|---|---|
| 2,935,210 A * | 5/1960 | Cohen | ............... | A47B 87/002 108/106 |
| 4,736,998 A * | 4/1988 | Wilson | ............... | A47B 83/02 297/140 |
| 5,547,270 A * | 8/1996 | Dang | ............... | A47B 39/00 297/140 |
| 5,765,910 A * | 6/1998 | Larkin | ............... | A47B 83/001 297/172 |
| 8,100,062 B1 * | 1/2012 | Anghel | ............... | A47B 3/08 108/69 |
| 2018/0125233 A1 * | 5/2018 | Leier | ............... | A47B 13/023 |

FOREIGN PATENT DOCUMENTS

| | | | |
|---|---|---|---|
| JP | 4291130 A | 10/1992 | |
| JP | 6328139 A | 11/1994 | |
| JP | 2010247267 A | 11/2010 | |
| JP | 201256044 A | 3/2012 | |

OTHER PUBLICATIONS

English Abstract and Machine Translation for Japanese Publication No. 64-040308 A, published Feb. 10, 1989, 6 pgs.
English Abstract and Machine Translation for Japanese Publication No. 2012-056044 A, published Mar. 22, 2012, 16 pgs.
English Abstract and Machine Translation for Japanese Publication No. 06-328139 A, published Nov. 29, 1994, 10 pgs.
English Abstract and Machine Translation for Japanese Publication No. 04-291130 A, published Oct. 15, 1992, 10 pgs.
English Abstract and Machine Translation for Chinese Publication No. 204565834 U, published Aug. 19, 2015, 4 pgs.

* cited by examiner

ROBOT BASE STAND

CROSS-REFERENCE TO RELATED APPLICATION

This application is based upon and claims the benefit of priority from Japanese Patent Application No. 2017-075244 filed on Apr. 5, 2017, the contents of which are incorporated herein by reference.

BACKGROUND OF THE INVENTION

Field of the Invention

The present invention relates to a robot base stand having a first support table for mounting a robot and a second support table for placing workpieces and the like.

Description of the Related Art

In the field of machine tools and injection molding machines, in order to automatically load/unload a workpiece to be machined, collect molded articles, and place insert parts for a molded article, there have been known a robot system that is made up from a robot and a workpiece support table to collect workpieces and molded articles and prepare insert parts.

Although it is necessary to install a robot system at a position close to a machine tool or an injection molding machine, if the system components such as a robot, a controller, a workpiece support table, etc. are integrated so as to be movable altogether, it becomes easier to deal with relocation of the system accompanying a layout change of the factory and/or a temporal system transfer for maintenance, thereby improving convenience. As one example, there has been a known movable robot system that loads/unloads workpieces, molded articles, and insert parts for molded articles by combining a machine tool or an injection molding machine with an articulated robot (see Japanese Laid-Open Patent Publication No. 2010-247267). Further, there has been another known movable system that is formed by integrating a robot with a workpiece support table for supplying and collecting workpieces, molded articles, and insert parts so as for the entire system to be movable (Japanese Laid-Open Patent Publication No. 64-040308).

SUMMARY OF THE INVENTION

The movable range of a robot varies depending on types of the robot, more specifically, the size, structure, and other factors of the robot. Accordingly, in integrating a workpiece support table with a robot, it is necessary to design the support table so as to optimize the function of the support table for every type of the robot.

The present invention has been devised in view of the above problems, it is therefore an object of the present invention to provide a versatile robot base stand that is adaptable to, or does not need design change for, different types of robots.

The aspect of the present invention resides in a robot base stand comprising: a first support table configured to mount a robot thereon; a second support table configured to place thereon objects to be handled by the robot; and a relative distance adjusting mechanism that adjusts the relative distance between the first support table and the second support table.

According to the robot base stand, for example, in a robot system for a machine tool or an injection molding machine, since the relative distance between the first support table and the second support table can be adjusted in accordance with the type of the robot, it is possible to provide a versatile robot base stand independent of the type of the robot. Consequently, it is possible to reduce the workload for the designing of the system, whereby the designing of the system that conventionally should have been done every time the type of the robot changes becomes easier and the cost of the system is reduced. Further, since a robot base stand suitable for the type of the robot can be prepared by only changing the relative distance between the first support table and the second support table, it is possible to reduce the workload for system setup.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a robot base stand according to the present invention will be described herein below with reference to the accompanying drawings.

Figure 1:
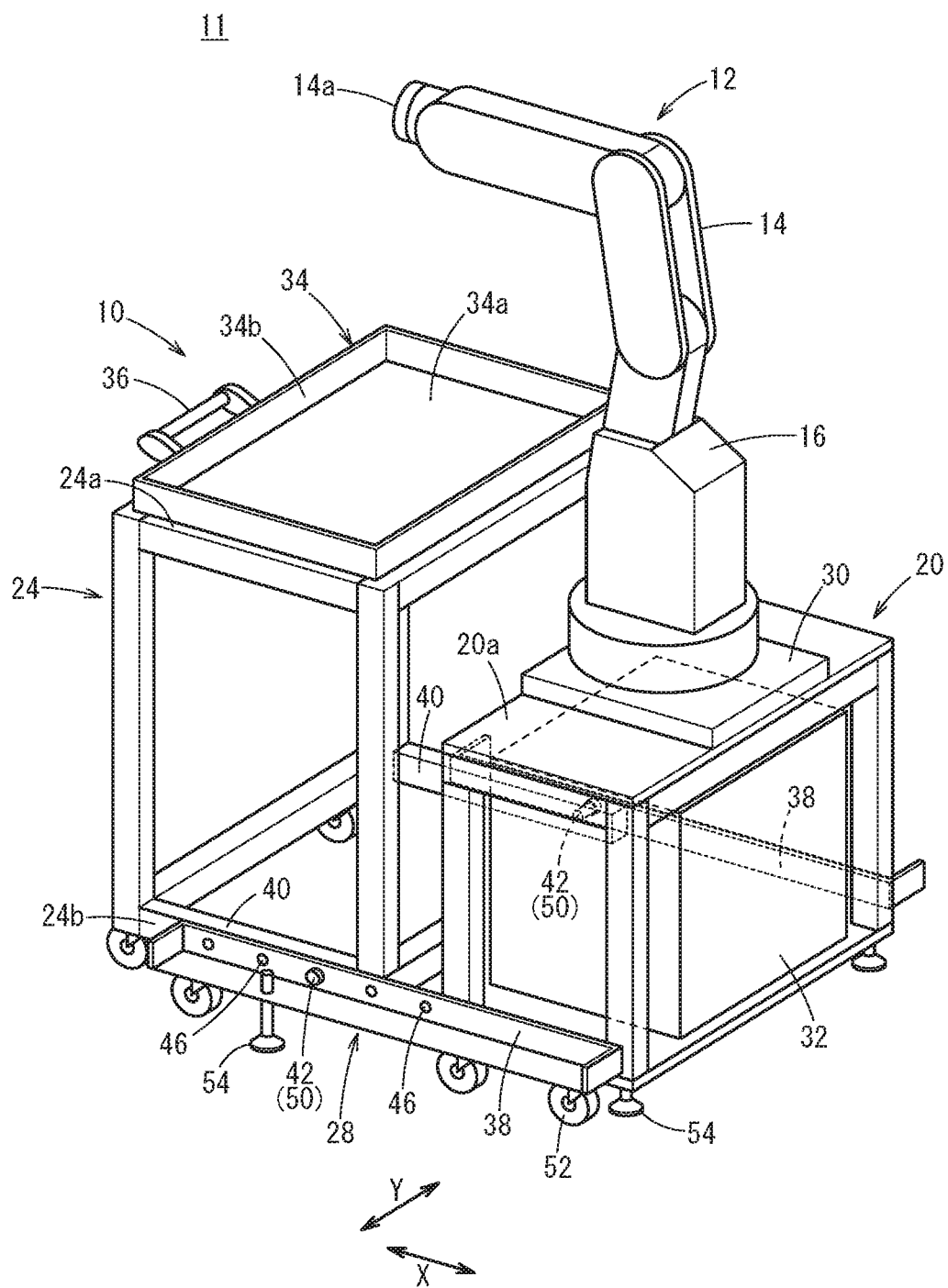
FIG. 1 is a perspective view of a robot base stand (on which a robot is mounted) according to an embodiment of the present invention.

A robot base stand 10 shown in FIG. 1 is used for mounting a robot 12 thereon in a robot system in which the robot 12 and a manufacturing machine (a machine tool, an injection molding machine, etc.) are combined. A unit 11 composed of the robot 12 and the robot base stand 10 is installed close to, for example, a machine tool or an injection molding machine.

The robot 12 mounted on the robot base stand 10 is, for example, a vertical articulated type industrial robot, and includes an arm 14 having a plurality of joints and a stand 16 supporting the arm 14. The arm 14 has an attaching part 14a at its distal end to which an end effector is attached. Examples of the end effector include a hand capable of gripping a target object to be handled by the robot 12, and others. The operating range of the robot 12 (the reachable region of the attaching part 14a) varies depending on the types of the robot 12, more specifically, the size, structure, and the like of the robot 12.

Examples of the object handled by the robot 12 include a workpiece to be machined (or having been machined) by a machine tool, an insert part for injection molding, a molded article collected from an injection molding machine, and the like. Hereinafter, the object is also referred to as "workpiece or the like". The robot 12 loads and unloads a workpiece or the like using an unillustrated end effector attached to the attaching part 14*a*.

The robot base stand 10 includes a first support table 20 configured to mount the robot 12 thereon, a second support table 24 configured to put workpieces and the like thereon, and a relative distance adjusting mechanism 28 for adjusting the relative horizontal distance between the first support table 20 and the second support table 24.

The stand 16 of the robot 12 is fixed to the table top, designated at 20*a*, of the first support table 20 via a mount portion 30. The first support table 20 shown in FIG. 1 is given in a framed form, but may be configured in a box-like form. A control unit 32 (numerical control device) for controlling the robot 12 in an integrated manner is disposed inside the first support table 20.

The second support table 24 is disposed, horizontally adjacent to the first support table 20. The second support table 24 shown in FIG. 1 takes a frame form but may take a box-like form. The second support table 24 is configured to be higher than the first support table 20 (the table top, designated at 24*a*, of the second support table 24 is higher than the table top 20*a* of the first support table 20). Here, depending on the type of the robot 12 to be mounted, the second support table 24 may be as high as or lower than the first support table 20.

A pallet 34 for placing workpieces and others is arranged on the table top 24*a* of the second support table 24. The pallet 34 has a bottom portion 34*a* and a peripheral wall portion 34*b* formed upright along the peripheral edge of the bottom portion 34*a*.

Provided in the upper part of second support table 24 is a grip handle 36 that can be gripped by the operator for moving the robot base stand 10. The grip handle 36 is arranged on the side of the second support table 24 opposite to the side that faces the first support table 20. It should be noted that the grip handle 36 may be provided at a different place of the second support table 24, may be provided for the first support table 20, or may be omitted.

The relative distance adjusting mechanism 28 is configured to select one distance from multiple relative distances between the first support table 20 and the second support table 24 set in advance according to types of robots 12 and fix the adjusted (selected) distance. The first support table 20 and the second support table 24 are coupled to each other by the relative distance adjusting mechanism 28 so as to be moved integrally. In the present embodiment, the relative distance adjusting mechanism 28 connects lower positions of the first support table 20 and the second support table 24. The relative distance adjusting mechanism 28 may connect the first support table 20 and the second support table 24 at higher positions above the aforementioned lower positions.

Specifically, the relative distance adjusting mechanism 28 includes a plurality of (two, in the illustrated example) first connecting portions 38 provided on the first support table 20 and a plurality of (two, in the illustrated example) second connecting portions 40 provided on the second support table 24, and a plurality of fixing parts 42 for fixing the multiple first connecting portion 38 and the multiple second connecting portion 40 with each other. The first connecting portions 38 extend in the direction of relative distance adjustment between the first support table 20 and the second support table 24 (extend in the direction of the arrow X), and are spaced from each other in the horizontal direction (the direction of the arrow Y) perpendicular to the direction of relative distance adjustment. The pair of second connecting portions 40 extends in the direction of relative distance adjustment and is spaced from each other in the horizontal direction perpendicular to the direction of relative distance adjustment.

Figure 2:
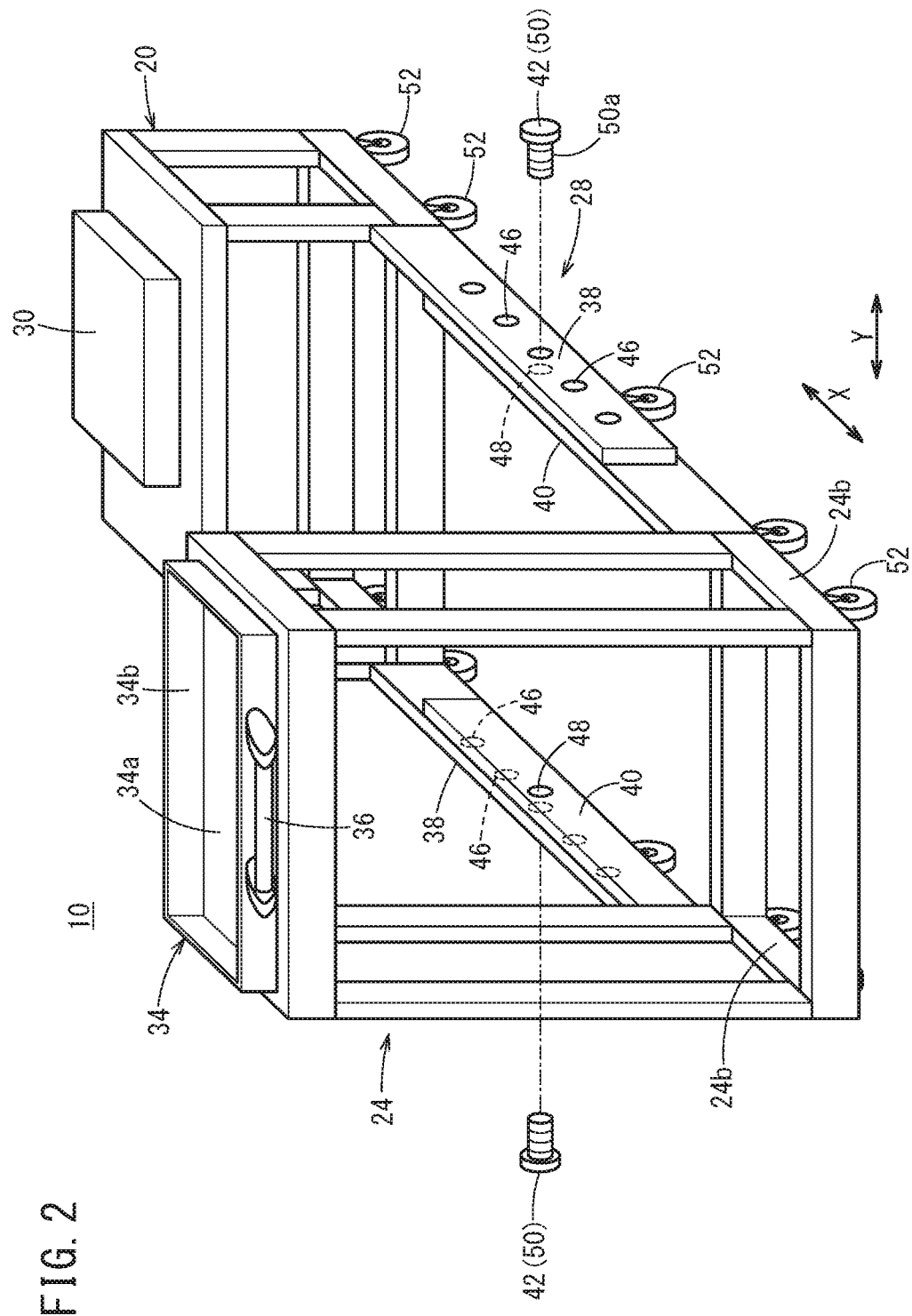
FIG. 2 is a schematic perspective view of a robot base stand.

As schematically shown in FIG. 2, the relative distance adjusting mechanism 28 includes a plurality of (five, along the direction of relative distance adjustment in the illustrated example) bolt insertion holes 46 provided at fixed positions with respect to the first support table 20, a threaded portion 48 (female thread/threaded hole) formed at a fixed position with respect to the second support table 24, and a bolt 50 inserted through one of the multiple bolt insertion holes 46 and screwed in the threaded portion 48.

The multiple bolt insertion holes 46 are arranged at intervals in the direction of relative distance adjustment between the first support table 20 and the second support table 24 (in the direction of the arrow X). Each of the multiple bolt insertion holes 46 is formed at a position corresponding to the type of the robot 12. In FIG. 2, the multiple bolt insertion holes 46 are formed in both of the two first connecting portions 38 that protrude from the first support table 20 horizontally along the direction of relative distance adjustment. The number of the bolt insertion holes 46 formed at intervals in the direction of relative distance adjustment may be 2 to 4, or 6 or more.

The first connecting portion 38 has an arm-like (bar-like) shape projected from the first support table 20 toward the second support table 24, and the multiple bolt insertion holes 46 are formed to penetrate through the first connecting portion 38 in the thickness direction thereof.

In this configuration, in order to enable the operator to easily and accurately recognize the bolt insertion hole 46 to be used when the relative distance between the first support table 20 and the second support table 24 is adjusted in accordance with the type of the robot 12 to be mounted, identification symbols (letters, figures, symbols, or combination thereof) corresponding to the type of the robot 12 may be present near each of the multiple bolt insertion holes 46.

Each of the two second connecting portions 40 includes one threaded portion 48. In FIG. 1, a lower frame 24*b* of the second support table 24 forms the second connecting portion 40. However, as shown in FIG. 2, the second connecting portion 40 may be configured as an arm-like (bar-like) form protruding from the second support table 24 toward the first support table 20.

The bolt 50 serves as the above-described fixing part 42 and has a male thread 50*a* that engages with the threaded portion 48. One bolt 50 (two, in total in this embodiment) is provided for one first connecting portion 38 and one second connecting portion 40. The bolt 50 is inserted through the bolt insertion hole 46 and screwed into the threaded portion 48, whereby the first connecting portion 38 and the second connecting portion 40 are fixed to each other when the bolt 50 is tightened. As a result, the relative distance between the first support table 20 and the second support table 24 is fixed and maintained.

It should be noted that, unlike the above-described configuration, a plurality of bolt insertion holes 46 may be formed in the second connecting portion 40 while a threaded portion 48 may be formed in the first connecting portion 38. Alternatively, a plurality of bolt insertion holes 46 may be formed in one of the first connecting portion 38 and the second connecting portion 40 while a bolt insertion hole may be formed in the other of the first connecting portion 38 and the second connecting portion 40 so that the bolt 50 is inserted into one of the plurality of bolt insertion holes 46 the bolt insertion hole and engages with a nut, whereby the first connecting portion 38 and the second connecting portion 40 are joined and fixed to each other.

The structure for joining and fixing the first connecting portion 38 and the second connecting portion 40 is not limited to the one that uses the bolt 50, but other structures may be adopted. For example, indentations may be formed in one of the first connecting portion 38 and the second connecting portion 40 and projections that engage with the indentations may be formed in the other of the first connecting portion 38 and the second connecting portion 40 while a restraining member for holding the engagement between the indentation and projection may be provided. In this case, the restraining member plays a role of the fixing part 42.

A plurality of casters 52 is provided below the robot base stand 10 so that the robot base stand 10 can be moved as required. Specifically, a plurality of casters 52 is provided below the first support table 20, and a plurality of casters 52 is provided below the second support table 24. In FIG. 2, the caster 52 is also provided for the first connecting portion 38 projected from the first support table 20. It should be noted that the caster 52 may not be necessarily provided for the first connecting portion 38. In FIG. 2, the caster 52 may be provided for the second connecting portion 40 projected from the second support table 24.

A plurality of stoppers 54 is provided below the robot base stand 10 as shown in FIG. 1 so that the position of the robot base stand 10 can be fixed. Positions of each stopper 54 can be adjusted in the vertical direction, and with the stoppers abutting against the floor surface on which the robot base stand 10 is installed, the position of the robot base stand 10 can be fixed.

Next, the operation of the robot base stand 10 thus configured will be described.

Figure 3A:
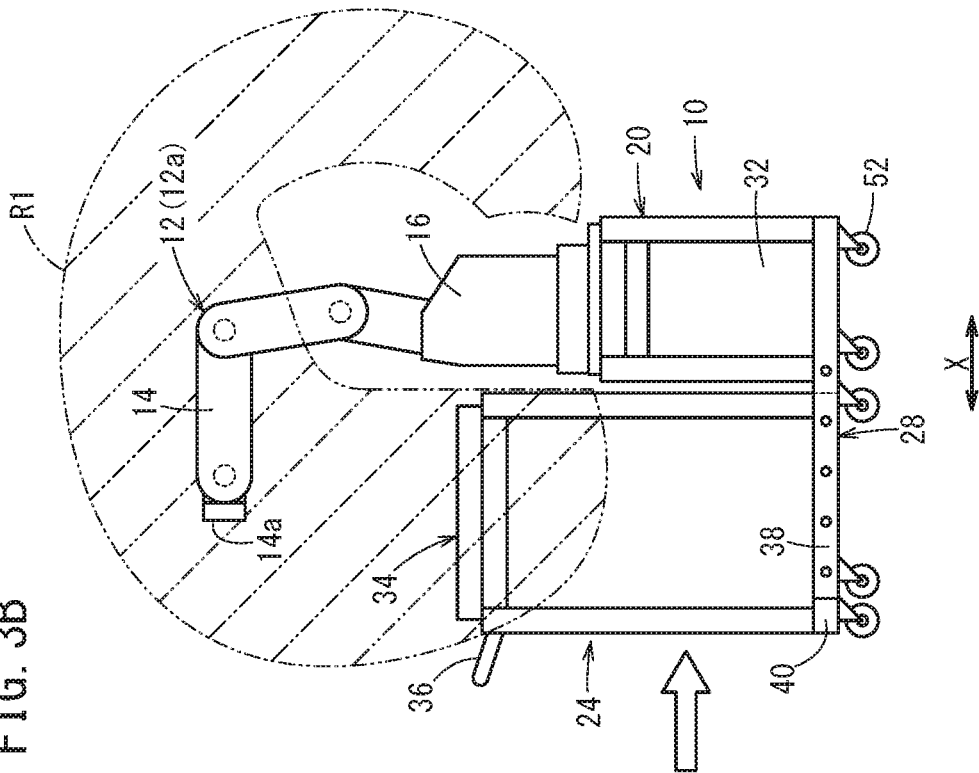
FIG. 3A is an illustrative diagram showing a relationship between the operating range of a small robot and a pallet of the robot base stand (before relative distance adjustment)
Figure 3B:
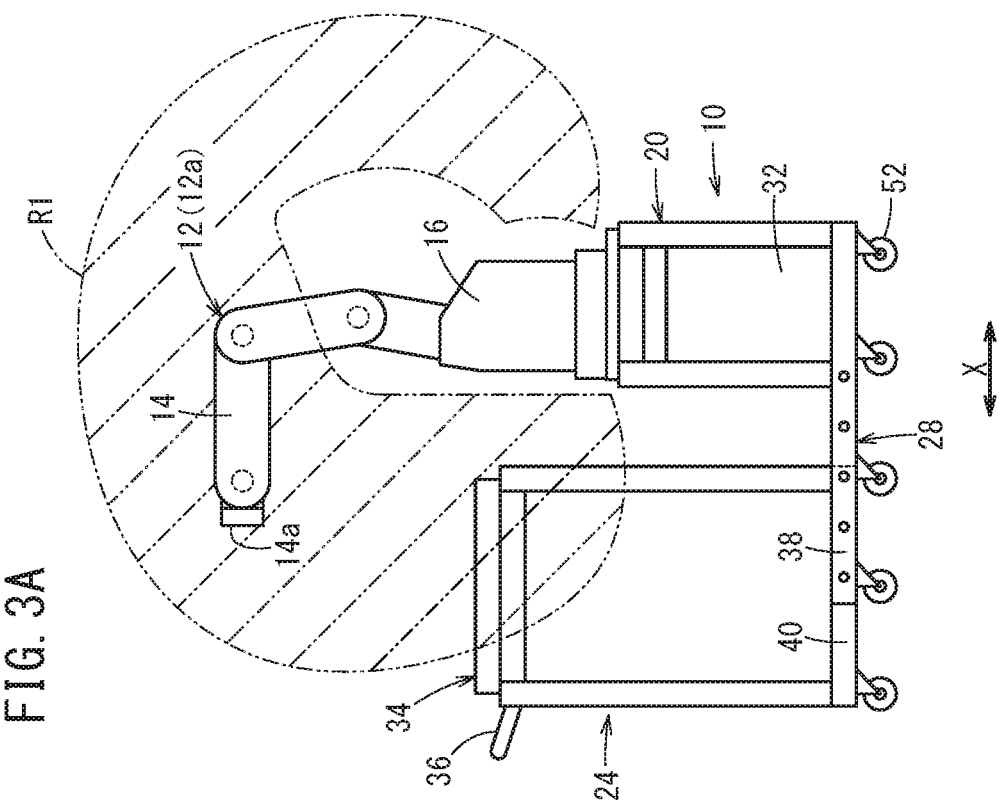
FIG. 3B is an illustrative diagram showing a relationship between the operating range of the small robot and the pallet of the robot base stand (after relative distance adjustment)

In FIG. 3A, a small robot 12a as the robot 12 is mounted on the first support table 20 of the robot base stand 10, and the relative distance between the first support table 20 and the second support table 24 has not yet been adjusted to the optimal distance for the robot 12a. Therefore, at least part of the pallet 34 provided on the second support table 24 stays outside an operating range R1 (the reachable region of the attaching part 14a) of the robot 12a. On the other hand, in FIG. 3B, the relative distance between the first support table 20 and the second support table 24 is adjusted to the optimum distance for the robot 12a by means of the relative distance adjusting mechanism 28. That is, in FIG. 3B, the relative distance between the first support table 20 and the second support table 24 is made closer than in the case of FIG. 3A, and the whole pallet 34 is contained inside the operating range R1 of the robot 12a.

Figure 4:
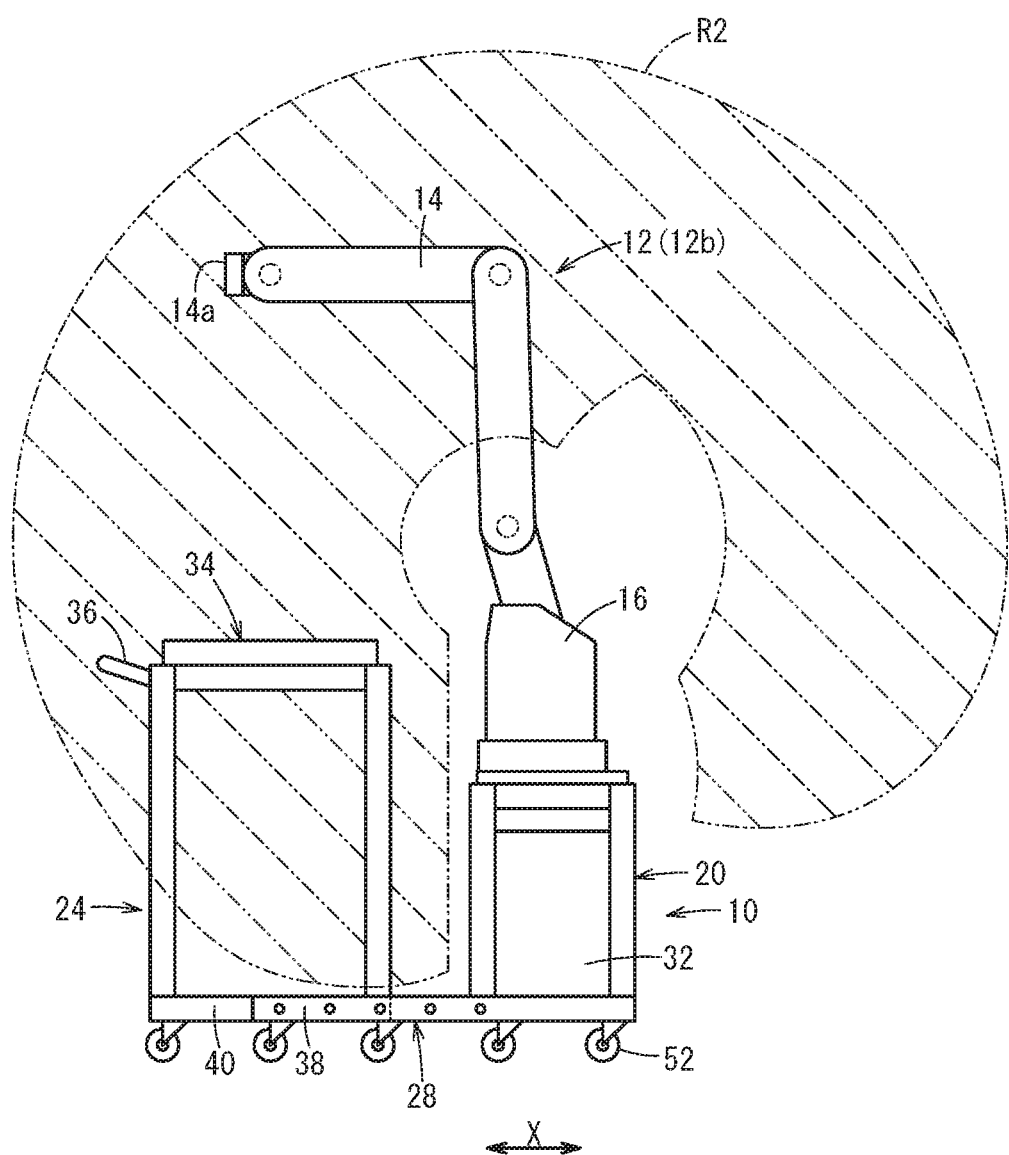
FIG. 4 is an illustrative diagram showing a relationship between the operating range of a large-sized robot and the pallet of the robot base stand.

In FIG. 4, a robot 12b larger in size than the robot 12a shown in FIG. 3A is mounted on the first support table 20 of the robot base stand 10 as the robot 12. The relative distance between the first support table 20 and the second support table 24 shown in FIG. 4 is the same as the relative distance between the first support table 20 and the second support table 24 shown in FIG. 3A, but the pallet 34 of the robot base stand 10 on which the robot 12b is mounted, is contained inside an operating range R2 of the robot 12b. That is, in FIG. 4, the relative distance between the first support table 20 and the second support table 24 is set to the optimum distance for the robot 12b.

In a case where a robot 12c (though not illustrated) greater in size than the robot 12b is mounted on the robot base stand 10 and if the first support table 20 and the second support table 24 are set with the relative distance of FIG. 4 so that the robot 12c is located too close to the second support table 24, the relative distance between the first support table 20 and the second support table 24 is adjusted so that the operating range of the robot 12c suitably covers the second support table 24. In this case, the relative distance between the first support table 20 and the second support table 24 is set to be greater than that shown in FIG. 4.

The robot base stand 10 according to the present embodiment has the following advantages.

According to the robot base stand 10, for example, in a robot system for a machine tool or an injection molding machine, since the relative distance between the first support table 20 and the second support table 24 can be adjusted in accordance with the type (the operation range R1, R2) of the robot 12, it is possible to provide a versatile robot base stand independent of the type of the robot 12. Consequently, it is possible to reduce the workload for the designing of the system, whereby the designing of the system conventionally should have been done every time the type of the robot 12 changes becomes easier and the cost of the system is reduced. Further, since a robot base stand suitable for the type of the robot 12 can be prepared by only changing the relative distance between the first support table 20 and the second support table 24, it is possible to reduce the workload for system setup.

The relative distance adjusting mechanism 28 is configured to permit selection of one distance from multiple relative distances preset in accordance with the types of the robot 12. Accordingly, it is possible to easily change the relative distance as appropriate in accordance with the type of the robot 12.

The first support table 20 and the second support table 24 are connected to each other by the relative distance adjusting mechanism 28 so as to be integrally moved. This makes it easier to relocate the system due to change in the factory layout or to temporarily relocate the system for maintenance, thereby improving convenience.

The relative distance adjusting mechanism 28 is configured to change the relative distance in the horizontal direction between the first support table 20 and the second support table 24. This makes it possible to appropriately change the relative distance between the first support table 20 and the second support table 24 in accordance with the operating range of the robot 12.

The relative distance adjusting mechanism 28 is configured to be able to fix the adjusted relative distance. This makes it possible to reliably maintain the appropriate relative distance between the first support table 20 and the second support table 24 adjusted according to the type of the robot 12.

The relative distance adjusting mechanism 28 includes: a plurality of first connecting portions 38 that is provided in the first support table 20, extends in the direction of relative distance adjustment between the first support table 20 and the second support table 24, and is spaced from each other in the horizontal direction perpendicular to the direction of relative distance adjustment; a plurality of second connecting portions 40 that is provided in the second support table 24, extends in the direction of relative distance adjustment, and is spaced from each other in the horizontal direction perpendicular to the direction of relative distance adjustment; and a plurality of fixing parts 42 for fixing the multiple first connecting portions 38 and the multiple second connecting portions 40 to each other. This configuration makes it possible to stably and reliably keep an appropriate relative distance between the first support table 20 and the second support table 24 adjusted in accordance with the type of the robot 12.

The relative distance adjusting mechanism 28 includes: a plurality of bolt insertion holes 46 formed at fixed positions with respect to one of the first support table 20 and the second support table 24, at intervals in the direction of relative distance adjustment between the first support table 20 and the second support table 24; a threaded portion 48 formed at a fixed position with respect to the other of the first support table 20 and the second support table 24; and a bolt 50 inserted through one of the multiple bolt insertion holes 46 and screwed into the threaded portion 48. Accordingly, the relative distance between the first support table 20 and the second support table 24 can be easily adjusted while the relative distance after adjustment can be stably and reliably maintained.

The present invention is not limited to the above-described embodiment, and various modifications can be made without departing from the gist of the present invention.

What is claimed is:

1. A robot base stand comprising:
   a first support table configured to mount a robot thereon;
   the robot fixed to the first support table;
   a second support table configured to place thereon objects to be handled by the robot; and
   a relative distance adjusting mechanism that adjusts a relative distance between the first support table and the second support table wherein the relative distance adjusting mechanism is configured to permit selection of one distance from a plurality of relative distances preset in accordance with types of the robot, wherein each of the preset distances is marked by an indicia indicative of the type of robot to be mounted to the first support table, wherein the relative distance adjusting mechanism includes:
   a plurality of first connecting portions that is provided in the first support table, extends in the direction of relative distance adjustment between the first support table and the second support table, and is spaced from each other in the horizontal direction perpendicular to the direction of relative distance adjustment;
   a plurality of second connecting portions that is provided in the second support table, extends in the direction of relative distance adjustment, and is spaced from each other in the horizontal direction perpendicular to the direction of relative distance adjustment; and
   a plurality of fixing parts for fixing the first connecting portions and the second connecting portions to each other, wherein the plurality of first connecting portions has an arm-like shape projecting toward the second support table, is displaceable horizontally with respect to the second support table in the direction of the relative distance adjustment, and is fixed with respect to the second support table at a position that is determined by the selected distance.

2. The robot base stand according to claim 1, wherein the first support table and the second support table are connected to each other by the relative distance adjusting mechanism and are integrally movable.

3. The robot base stand according to claim 1, wherein the relative distance adjusting mechanism is configured to change the relative distance in the horizontal direction between the first support table and the second support table.

4. The robot base stand according to claim 1, wherein the relative distance adjusting mechanism is configured to fix the adjusted relative distance.

5. The robot base stand according to claim 4, wherein the relative distance adjusting mechanism includes:
   a plurality of first connecting portions that is provided in the first support table, extends in the direction of relative distance adjustment between the first support table and the second support table, and is spaced from each other in the horizontal direction perpendicular to the direction of relative distance adjustment;
   a plurality of second connecting portions that is provided in the second support table, extends in the direction of relative distance adjustment, and is spaced from each other in the horizontal direction perpendicular to the direction of relative distance adjustment; and
   a plurality of fixing parts for fixing the first connecting portions and the second connecting portions to each other.

6. The robot base stand according to claim 4, wherein the relative distance adjusting mechanism includes:
   a plurality of bolt insertion holes formed at fixed positions with respect to one of the first support table and the second support table, at intervals in the direction of relative distance adjustment between the first support table and the second support table;
   a threaded portion formed at a fixed position with respect to the other of the first support table and the second support table; and
   a bolt inserted through one of the bolt insertion holes and screwed into the threaded portion.

7. The robot base stand according to claim 1, wherein a control unit that controls the robot in an integrated manner is disposed inside the first support table.

8. The robot base stand according to claim 1, wherein a pallet on which a workpiece is placed is arranged on a top of the second support table.

9. A robot base stand comprising:
   a first support table configured to mount a robot thereon;
   the robot fixed to the first support table;
   a second support table configured to place thereon objects to be handled by the robot and
   a relative distance adjusting mechanism that adjusts a relative distance between the first support table and the second support table wherein the relative distance adjusting mechanism is configured to permit selection of one distance from a plurality of relative distances preset in accordance with types of the robot, wherein a plurality of casters and a plurality of stoppers are provided below the robot base stand,
   positions of the stoppers are adjustable in a vertical direction, and
   with the stoppers abutting against a floor surface, a position of the robot base stand is fixed.

* * * * *